US008108205B2

(12) United States Patent
Paek et al.

(10) Patent No.: US 8,108,205 B2
(45) Date of Patent: Jan. 31, 2012

(54) LEVERAGING BACK-OFF GRAMMARS FOR AUTHORING CONTEXT-FREE GRAMMARS

(75) Inventors: Timothy Paek, Sammamish, WA (US); Max Chickering, Bellevue, WA (US); Eric Badger, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 977 days.

(21) Appl. No.: 11/607,284

(22) Filed: Dec. 1, 2006

(65) Prior Publication Data

US 2008/0133220 A1 Jun. 5, 2008

(51) Int. Cl.
*G06F 17/27* (2006.01)

(52) U.S. Cl. ............ 704/9; 704/243; 704/244; 704/251; 704/257

(58) Field of Classification Search ...... 704/9, 243–244, 704/251, 257
See application file for complete search history.

(56) References Cited

U.S. PATENT DOCUMENTS

| | | | | |
|---|---|---|---|---|
| 5,579,436 | A * | 11/1996 | Chou et al. | 704/244 |
| 5,732,187 | A | 3/1998 | Scruggs et al. | 395/2.61 |
| 5,745,876 | A * | 4/1998 | Kneser et al. | 704/255 |
| 6,016,470 | A * | 1/2000 | Shu | 704/244 |
| 6,058,363 | A | 5/2000 | Ramalingam | 704/251 |
| 6,076,054 | A | 6/2000 | Vysotsky et al. | 704/240 |
| 6,092,044 | A | 7/2000 | Baker et al. | 704/254 |
| 6,662,157 | B1 | 12/2003 | Horowitz et al. | 704/235 |
| 6,668,243 | B1 * | 12/2003 | Odell | 704/243 |
| 6,778,959 | B1 | 8/2004 | Wu et al. | 704/256 |
| 6,836,760 | B1 * | 12/2004 | Bellegarda et al. | 704/257 |
| 7,092,888 | B1 * | 8/2006 | McCarthy et al. | 704/277 |
| 7,103,542 | B2 | 9/2006 | Doyle | 704/231 |
| 7,136,815 | B2 * | 11/2006 | Garudadri | 704/255 |
| 7,409,342 | B2 * | 8/2008 | Kashima et al. | 704/240 |
| 2002/0072914 | A1 * | 6/2002 | Alshawi et al. | 704/270.1 |
| 2003/0191625 | A1 * | 10/2003 | Gorin et al. | 704/1 |
| 2004/0098253 | A1 | 5/2004 | Balentine et al. | 704/215 |
| 2006/0074671 | A1 | 4/2006 | Farmaner et al. | 704/257 |
| 2006/0129397 | A1 | 6/2006 | Li et al. | 704/245 |
| 2007/0239453 | A1 * | 10/2007 | Paek et al. | 704/257 |
| 2007/0239454 | A1 * | 10/2007 | Paek et al. | 704/257 |

OTHER PUBLICATIONS

Balakrishna, M.; Moldovan, D.; Cave, E.K., "Automatic creation and tuning of context free grammars for interactive voice response systems," Natural Language Processing and Knowledge Engineering, 2005. IEEE NLP-KE '05. Proceedings of 2005 IEEE International Conference on, Nov. 2005, pp. 158-163.*

Cave et al, "Efficient Grammar Generation and Tuning for Interactive Voice Response Applications," Acoustics, Speech and Signal Processing, 2006. ICASSP 2006 Proceedings. 2006 IEEE International Conference on, pp. I-I, May 2006, pp. 14-19.*

(Continued)

*Primary Examiner* — David R Hudspeth
*Assistant Examiner* — Lamont Spooner
(74) *Attorney, Agent, or Firm* — Westman, Champlin & Kelly, P.A.

(57) ABSTRACT

A system and method of refining context-free grammars (CFGs). The method includes deriving back-off grammar (BOG) rules from an initially developed CFG and utilizing the initial CFG and the derived BOG rules to recognize user utterances. Based on a response of the initial CFG and the derived BOG rules to the user utterances, at least a portion of the derived BOG rules are utilized to modify the initial CFG and thereby produce a refined CFG. The above method can carried out iterativey, with each new iteration utilizing a refined CFG from preceding iterations.

6 Claims, 6 Drawing Sheets

OTHER PUBLICATIONS

Ohtani et al., "A Semi-Automatic Learning Method of Grammar Rules for Spontaneous Speech," In Proc. of Natural Language Procesing, Pacific Rim Symposium '95, 1995, pp. 514-519.*

Galescu et al, "Rapid Language Model Development for New Task Domains," In Proceedings of the First International Conference on Language Resources and Evaluation (LREC), Granada, Spain, May 1998, pp. 1-6.* de Lima et al, "Assigning Grammatical Relations with a Back-off Model," In Proceedings of the Second Conference on Empirical Method in Natural Language Processing, Jun. 1997, pp. 90-96.*

Johnsen et al., Stochastic Modeling of Semantic Content for Use in a Spoken Dialogue System, Sixth International Conference on Spoken Language Processing), 2000, pp. 1-4.*

Abelson, WAV, 2005, Wikipedia, pp. 1-3.*

Yu et al., N-Gram Based Filler Model for Robust Grammar Authoring, 2006, IEEE, pp. 565-568.*

C. Allauzen et al., "A General Weighted Grammar Library," http://www.cs.nyu.edu/~mohri/postscript/nngrm.pdf, Proceedings of the Ninth International Conference on Implementation and Application of Automata (CIAA'2004), vol. 3317 of Lecture Notes in Computer Science. Springer, Jul. 22, 2004, pp. 1-12.

T. Kawahara et al., "Flexible Speech Understanding Based on Combined Key-Phrase Detection and Verification," IEEE Transactions on Speech and Audio Processing, vol. 6, No. 6, Nov. 1998, pp. 558-568.

R. Moore, "Using Natural-Language Knowledge Sources in Speech Recognition," In Computational Models of Speech Pattern Processing, Ponting (ed.), Springer-Verlag, Jan. 1999, pp. 1-23.

* cited by examiner

LEVERAGING BACK-OFF GRAMMARS FOR AUTHORING CONTEXT-FREE GRAMMARS

BACKGROUND

In general, speech recognition applications allow users to interact with a system by using their voice. Typical command-and-control (C&C) speech applications allow users to interact with a system by speaking commands and/or asking questions restricted to fixed, grammar-containing pre-defined phrases. While speech recognition applications have been commonplace in telephony and accessibility systems for many years, only recently have mobile devices had the memory and processing capacity to support not only speech recognition, but a whole range of multimedia functionalities that can be controlled by speech.

Furthermore, the ultimate goal of the speech recognition technology is to be able to produce a system that can recognize with 100% accuracy all of the words that are spoken by any person. However, even after years of research in this area, the best speech recognition software applications still cannot recognize speech with 100% accuracy. For example, most commercial speech recognition applications utilize context-free grammars (CFGs) for C&C speech recognition. Typically, these grammars are authored to try to achieve broad coverage of utterances while remaining relatively small for faster performance. As such, some speech recognition applications are able to recognize over 90% of the words, when speakers produce utterances that fit within the constraints of the grammars.

Unfortunately, despite attempts to cover all possible utterances for different commands, users occasionally produce expressions that fall outside of the grammars (e.g., out-of-grammar (OOG) user utterances). For example, suppose the grammar is authored to anticipate the expression "What is my battery strength?" for reporting device power. If the user forgets that expression, or simply does not read the instructions, and utters "Please tell me my battery strength," the speech recognizer will either produce a recognition result with very low confidence or no result at all. This can lead to the speech recognition application failing to complete the task on behalf of the user. Further, if users unknowingly believe and expect that the speech recognition application should recognize the utterance, the user would conclude that the speech recognition application is faulty or ineffective, and cease from using the product.

In general, due to the above-noted problems, a relatively long development cycle, which typically involves a complex and costly grammar-authoring process, is required to get an application that utilizes CFGs to a relatively high speech recognition accuracy level.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

A method for relatively efficiently refining context-free grammars (CFGs) in a CFG authoring process is provided. The method includes deriving back-off grammar (BOG) rules from an initially developed CFG and utilizing the initial CFG and the BOG rules to recognize user utterances. Based on a response of the initial CFG and the derived BOG rules to the user utterances, at least a portion of the derived BOG rules are utilized to modify the initial CFG and thereby produce a refined CFG. One example of how the BOG rules can be used to modify the initial CFG involves collecting data related to the manner in which the BOG rules handle out-of-grammar (OOG) utterances and selectively transcribing the collected data. The selectively transcribed data is then utilized to alter the initial CFG.

The above method can be carried out iterativey, with each new iteration utilizing a refined CFG from preceding iterations. A speech recognition system that is capable of carrying out the above method is also provided.

DETAILED DESCRIPTION

Figure 1A:
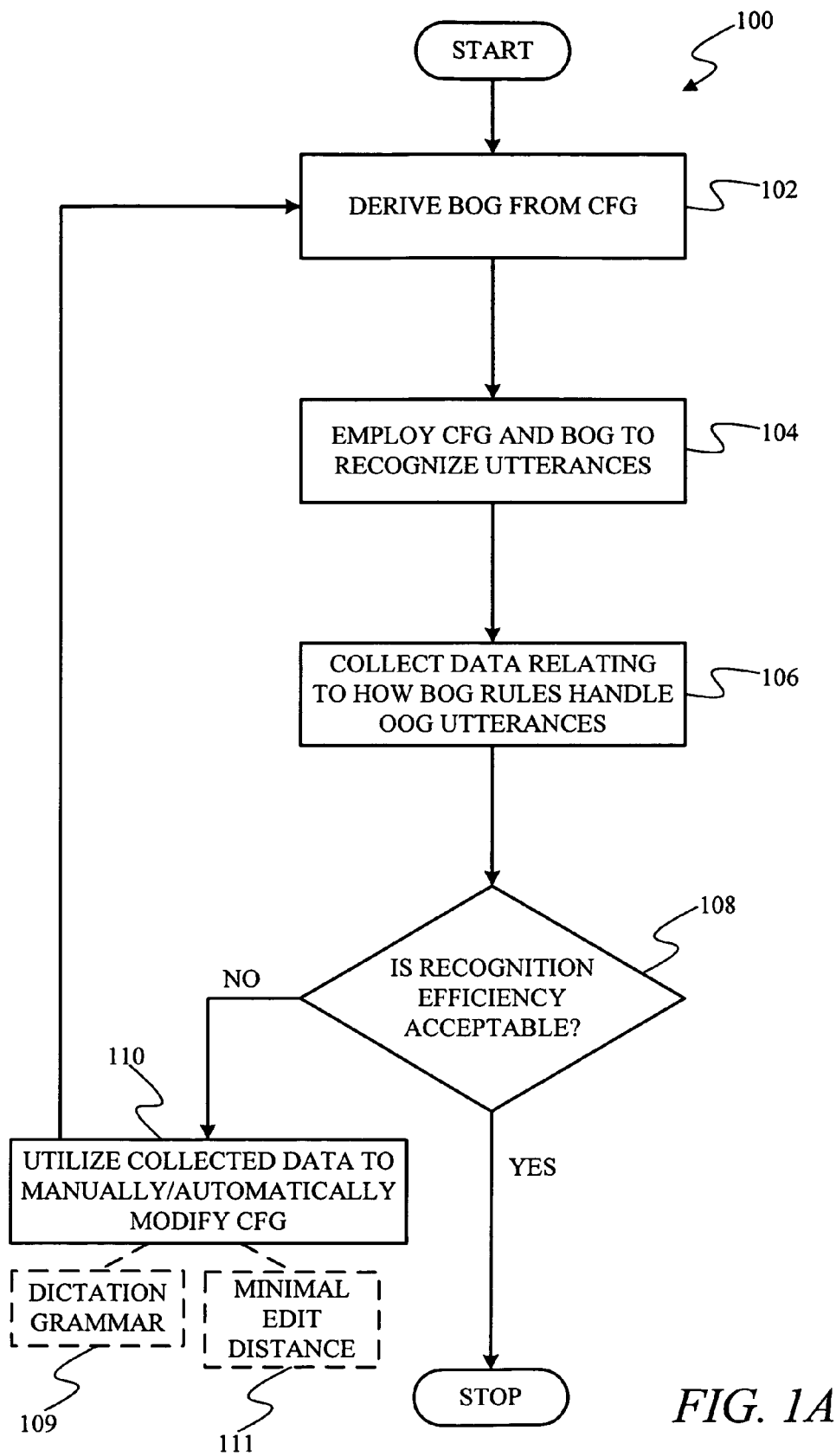
FIG. 1A is a flowchart showing an example method embodiment that utilizes a BOG generated from a CFG to refine the CFG.

Disclosed here are embodiments that provide improved techniques for authoring context-free grammars (CFGs), which are utilized for speech recognition. Before providing descriptions of specific example embodiments, a brief description that relates to certain general features of the present embodiments is provided.

As indicated earlier, typically, a CFG defines grammar rules which specify words and patterns of words to be listened for and recognized. Developers of CFG grammar rules attempt to cover all possible utterances for different commands a user might produce. Unfortunately, despite attempts to cover all possible utterances for different commands, users occasionally produce expressions that fall outside of the grammar rules (e.g., out-of-grammar (OOG) utterances). When processing these OOG user utterances, the CFG typically returns a recognition result with very low confidence or no result at all. Accordingly, this could lead to the speech recognition application failing to complete the task on behalf of the user.

Generating new grammar rules to identify and recognize the OOG user utterances is desirable. By "recognize," it is meant that the OOG user utterance is correctly mapped to its intended CFG rule. Thus, for augmenting a CFG's ability to process OOG utterances, the present embodiments utilize a back-off grammar (BOG), in combination with the CFG, for speech recognition. The BOG can be a collection of grammar rules that are generated by combining slots and keywords, for example, from rules of the CFG. The default case is to generate back-off rules for all CFG rules. Alternatively, back-off rules can be selectively generated based on a user model and/or heuristics. It should be noted that more than one back-off rule can be generated for a CFG rule, depending on the number of constituent parts (i.e., keywords or slots).

The CFG rules generally recognize user utterances with better performance (e.g., speed) than the BOG rules, but can have difficulty processing OOG user utterances. Specifically, the CFG rules constrain the search space of possible expressions, such that if a user produces an utterance that is covered by the CFG rules, the CFG rule can generally recognize the utterance with better performance than BOG rules with filler tags, for example, which generally have a much larger search space. However, unrecognized user utterances (e.g., OOG user utterances) can cause the CFG rules to produce a recognition result with lower confidence or no result at all, as the OOG user utterance does not fall within the pre-conscribed CFG rules. Whereas, the BOG rules employing the re-written grammar rules can typically process the OOG user utterance and produce a recognition result with much higher confidence. Thus, example embodiments utilize the CFG rules to process the user utterance as a first pass, since, as noted above, the CFG rules generally perform better on computationally limited devices. If the user utterance is an OOG user utterance, it is processed with the BOG rules as a second pass.

In the above example two-pass approach, in addition to being able to take advantage of the BOG for handling OOG expressions, it is also possible to collect data related to utterances that different BOG rules were able to capture and to utilize this data to modify CFG rules. In general, a BOG generated from a CFG can be used within an iterative authoring process to improve/refine the CFG. FIGS. 1A-3, which a described below, are example embodiments for refining a CFG using a BOG.

FIG. 1A is a flowchart 100 of an example method embodiment that utilizes a BOG generated from a CFG to refine the CFG. In the method of flowchart 100, at step 102, a BOG is derived form an initial CFG. An example showing the generation of an initial CFG and the derivation of a BOG from the initial CFG is provided further below. At step 104, the initial CFG and the derived BOG are deployed and utilized for recognizing user utterances. At step 106, data relating to how BOG rules handle OOG utterances is collected. As step 108, a determination is made as to whether the CFG rules and the BOG rules are operating at an acceptable recognition efficiency (e.g., with high enough confidence, or some other measure of reliability, and a desired recognition speed). If an improvement in recognition efficiency is desired, at step 110, data collected at step 102 is utilized to manually/automatically refine the initial CFG. As can be seen in FIG. 1A, the CFG refining process is iterative. In this iterative process, each new iteration utilizes a refined CFG from an immediately previous iteration. The process is stopped if further improvement in recognition efficiency is not desired. It should be noted that it is not necessary for the BOG rules to be updated every time the CFG is modified.

Figure 1B:
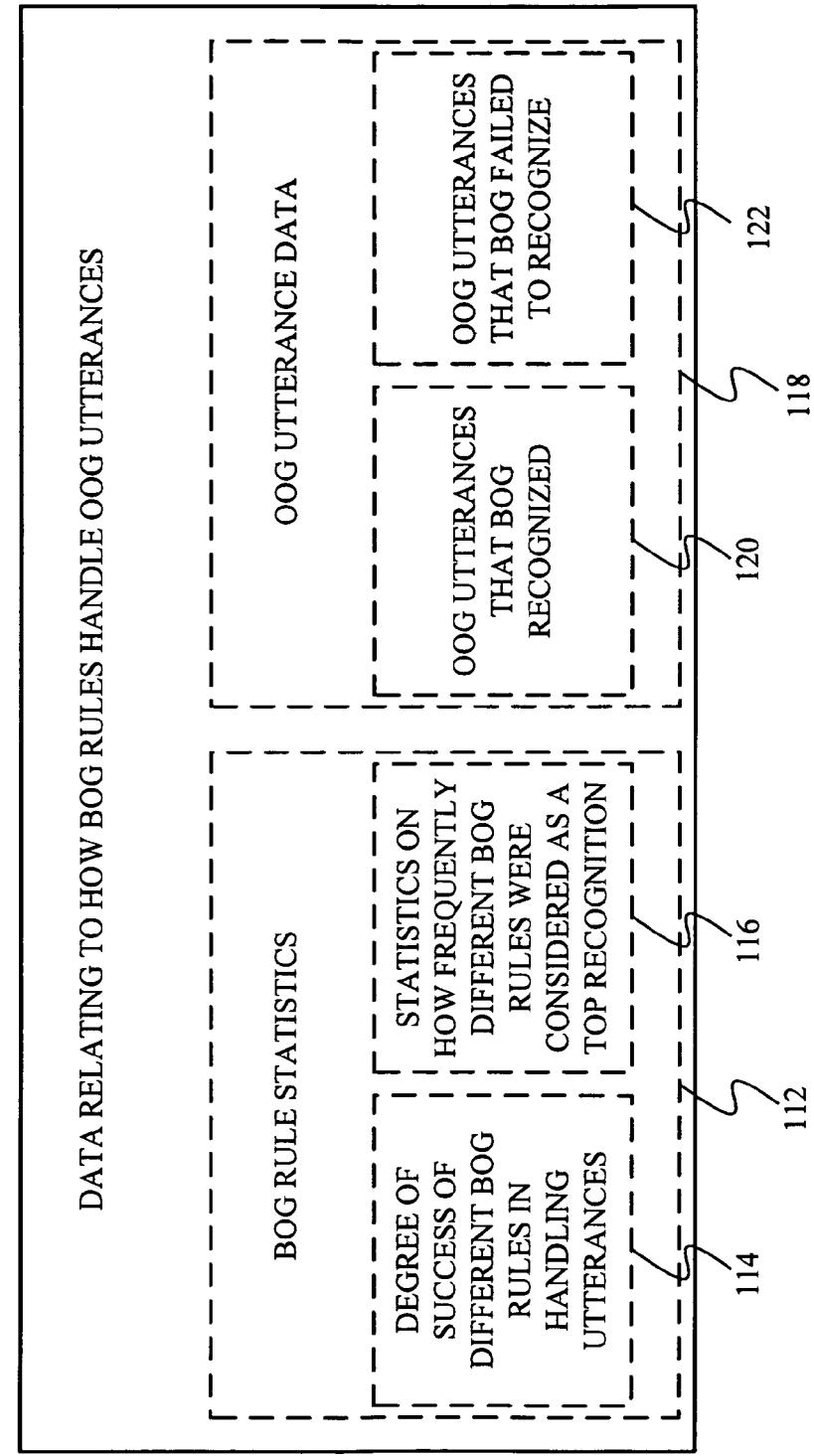
FIG. 1B is a simplified block diagram that shows examples of different types of data collected in connection with the embodiment of FIG. 1A.

FIG. 1B shows examples of different types of data, relating to how BOG rules handle utterances, which can be collected (at step 106 of FIG. 1) and utilized to modify the CFG (at step 110 of FIG. 1). As can be see in FIG. 1B, the collected data can be different BOG grammar rule statistics (denoted by reference numerals 112, 114 and 116) and/or different OOG utterance-related data (denoted by reference numerals 118, 120 and 122). Therefore, depending upon the type of data collected and/or the manner in which the collected data is utilized to modify the CFG, a number of different embodiments are possible.

In general, the present embodiments utilize BOG rule statistics to selectively transcribe user utterances. The BOG rule statistics used can relate to how frequently different BOG rules were considered as a top recognition (i.e., which BOG rules handled the most utterances). Alternatively, the BOG rule statistics can relate to how successful or unsuccessful different BOG rules were in handling particular OOG user utterances.

As indicated above, the BOG rule statistics or the portion of user utterances selected for transcription can either be manually or automatically transcribed. The automatic transcription of selected user utterances can be carried out using any suitable automatic transcription method, such as by employing a dictation grammar (denoted by reference numeral 109 in FIG. 1A). It should be noted that, instead of a dictation grammar, any other wider coverage language model relative to the CFG can be employed.

Similarly, the CFG may either be manually or automatically altered using the selectively transcribed user utterances. Automatic adjustment of the CFG can be carried out using minimal edit distance techniques (denoted by reference numeral 111 in FIG. 1A), for example. In general, any suitable method for automatically adjusting the CFG, based on selectively transcribed user utterances, can be employed. An example illustrating the formation of an initial CFG, the generation of a BOG from the initial CFG and the subsequent modification of the initial CFG, is provided below. This example builds on the earlier example related to grammar rules for reporting device power.

As noted above, CFG rules can define grammar rules which specify the words and patterns of words to be listened for and recognized. In general, the CFG rules can include at least three constituent parts: carrier phrases, keywords and slots. Carrier phrases are text that is used to allow more natural expressions than just stating keywords and slots (e.g., "what is," "tell me," etc.). Keywords are text that allow a command or rule to be uniquely identified or distinguished from other commands or rules. The keyword represents a semantic attribute or concept for the grammar rule. For example, the keyword "battery" appears only in the grammar rule or concept for reporting device power. Slots are dynamically adjustable lists of text items, such as, <contact name>, <date>, etc., where the list represents a semantic attribute and the items represent a semantic value for the attribute.

Although all three constituent parts play an important role for recognizing the correct utterance, only keywords and slots are critical for selecting the appropriate command. For example, knowing that a user utterance contains the keyword "battery" is more critical than whether the employed wording was "What is my battery strength?" or "What is the battery level?" Keywords and slots can be automatically identified by parsing the CFG rules. Typically, slots are labeled as rule references, and keywords can be classified using heuristics, such as keywords are words that only appear in one command, or only before a slot. Alternatively, besides automatic classification, slots and keywords can be labeled by the grammar authors themselves.

As noted earlier, developers of the CFG rules attempt to cover all possible utterances for different commands a user might produce. Unfortunately, despite attempts to cover all possible utterances for different commands, users occasionally produce expressions that fall outside of the grammar rules (e.g., OOG utterances). For example, if the CFG rules are authored to anticipate the expression "What is my battery strength?" for reporting device power, then a user utterance of "Please tell me my battery strength." would not be recognized by the CFG rules and would be delineated as an OOG utterance. Generally, the CFG rules can process the user utterances and produce a recognition result with high confidence, a recognition result with low confidence or no recognition result at all.

A fist stage in developing a BOG can involve identifying keywords and/or slots of the CFG by parsing the CFG rules. After the keywords and/or slots are identified, filler tags can be added before and/or after the keywords and/or slots to create new grammar rules. Filler tags can be based on both garbage tags and/or dictation tags. Garbage tags (e.g., "<WILDCARD>" or " . . . " in a speech API) look for specific words or word sequences and treat the rest of the words like garbage. For example, for a user utterance of "What is my battery strength?" the word "battery" is identified and the rest of the filler acoustics are thrown out. Dictation tags (e.g., "<DICTATION>" or "*" in a speech API (SAPI)) match the filler acoustics against words in a dictation grammar. For example, a CFG rule for reporting device power: "What is {my|the} battery {strength}|level}?" can be re-written as " . . . battery . . . " or "* battery" in a new grammar rule. Alternatively, new grammar rules can also be based on phonetic similarity to keywords, instead of exact matching of keywords (e.g., approximate matching). Accordingly, BOG rules can be generated based at least in part on the combination of these new grammar rules. The new grammar rules comprising the BOG rules can then be employed for identifying and recognizing OOG user utterances.

For example, the above CFG rule: "What is {my|the} battery {strength}|level}?" can fail to recognize the utterance, "Please tell me how much battery I have left." Whereas, the re-written grammar rules " . . . battery . . . " and "* battery *" of the BOG rules can produce a recognition result with much higher confidence. In fact, the dictation tag rule of the BOG rules can also match the carrier phrase "Please tell me how much" and "I have left." The OOG utterance and the matched carrier phrases can be saved and, in accordance with the present embodiments, utilized to modify the CFG by selective incorporation into the initial CFG. A very simple example can involve selecting the carrier phrases "Please tell me how much" and "I have left," from the saved data, and directly adding these phrases to the initial CFG. Of course, most applications require much more complex selective transcription of data, and incorporation of the selectively transcribed data, for modifying a CFG.

In summary, the above example embodiments generate and utilize BOGs, keep statistics on how BOG rules handle failed utterances, examine the statistics to selectively transcribe most frequently occurring utterances, for example, and adjust the CFG either manually or automatically. As noted above, this process typically involves iteratively adjusting the CFG.

It should be noted that the above embodiments provide only a few examples for choosing utterances for transcription. However, one skilled in the art should recognize that there are numerous possible ways of deciding which utterances to selectively transcribe.

The above-described embodiments allow developers to deploy applications relatively quickly, allow applications to handle OOG utterances that would otherwise have been dropped, and reduce transcription cost by facilitating selective annotation of failed utterances based on BOG statistics.

Figure 2:
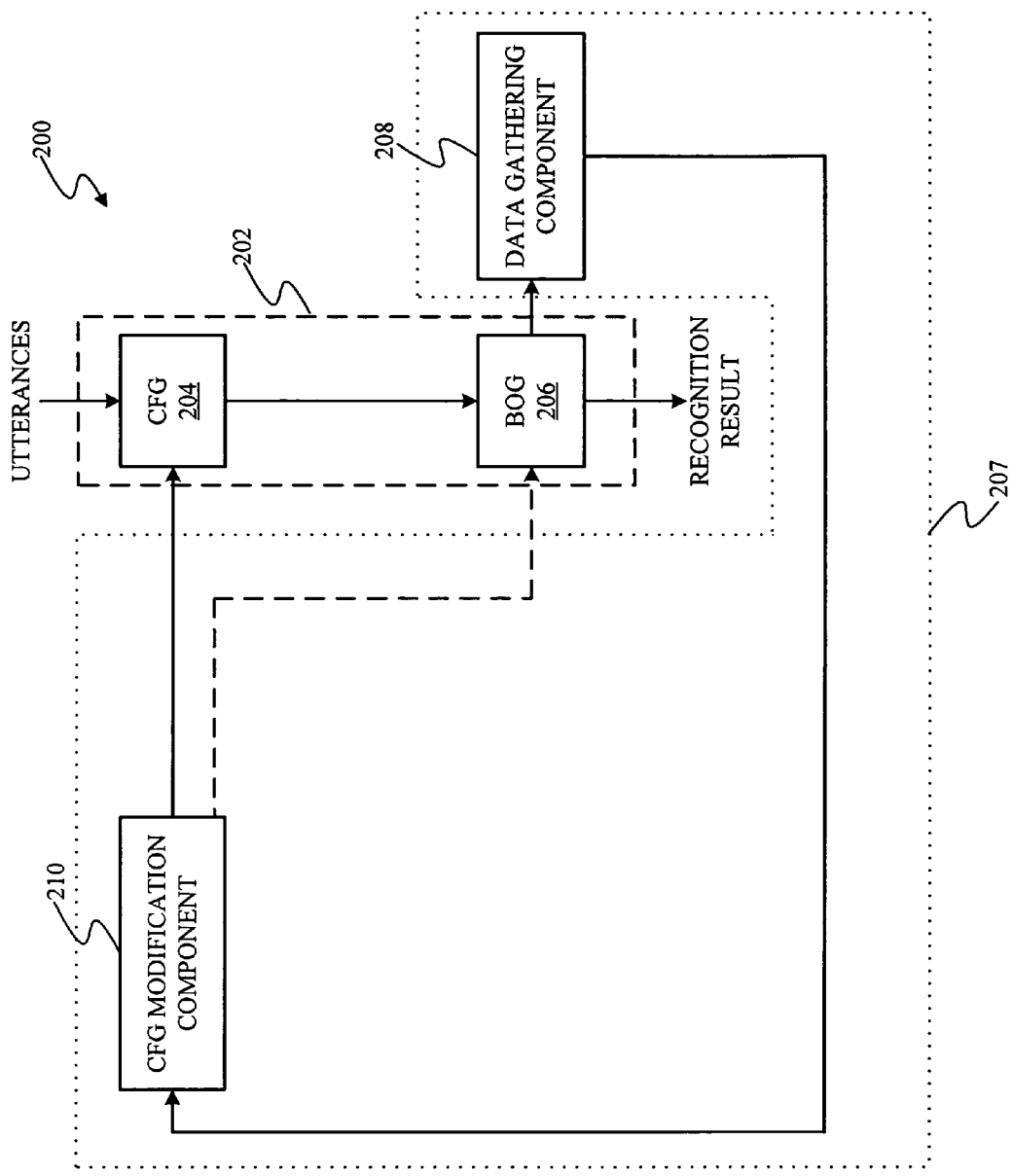
FIG. 2 is a simplified block diagram of an adaptive speech recognition system in accordance with one of the present embodiments.

FIG. 2 is a simplified block diagram of an adaptive speech recognition system 200 within which a CFG is refined in a manner similar to that described above. For simplification, components such as a microphone, which is utilized in the adaptive speech recognition system for detecting audio signals, and other components that are common to different speech recognition systems are excluded from FIG. 2. Adaptive speech recognition system 200 includes, as its primary components, a language model 202, which includes a CFG 204 and a BOG 206 derived from CFG 204, and a grammar refining component 207, which is capable of altering grammars within language model 202. In system 200, in general, language model 202 helps process utterances and helps output recognition results. In specific embodiments, CFG 204 process a user utterance as a first pass. If the user utterance is an OOG user utterance, it is processed with BOG 206 as a second pass before a recognition result is output. To carry out the adaptive refining of CFG 204, grammar refining component 207 includes a data gathering component 208, which collects BOG statistics, in a manner described earlier, and a CFG modification component 210, which is configured to periodically selectively transcribe data in component 208 and utilize the selectively transcribed data to automatically modify CFG 204. In some of the present embodiments, CFG modification component 210 is also configured to modify BOG 206 when CFG 204 is modified. A specific example of a CFG modification method that can be carried out in a speech recognition system such as 200 is described below in connection with FIG. 3.

Figure 3:
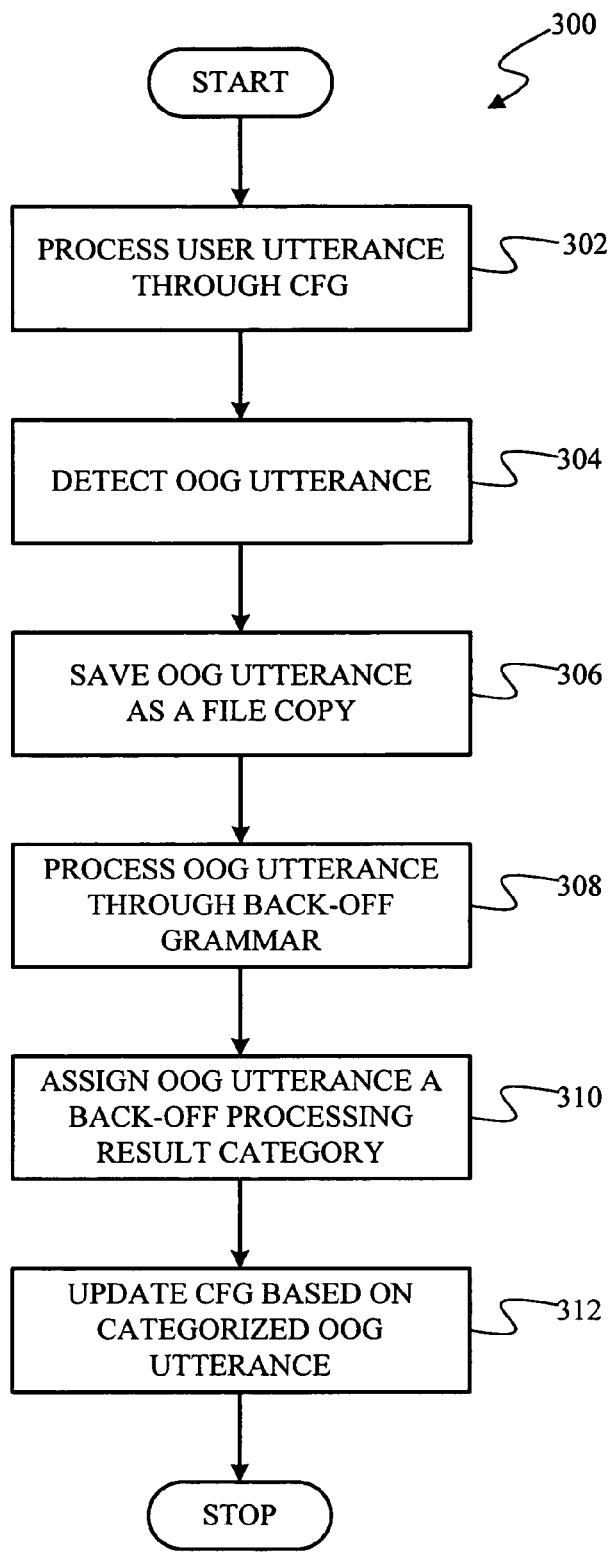
FIG. 3 is a flowchart showing another example method embodiment that utilizes a BOG generated from a CFG to refine the CFG.

FIG. 3 is a flowchart 300 showing one iteration of an example method embodiment that utilizes a BOG generated from a CFG to refine the CFG. In the method of FIG. 3, at step 302, a user utterance is processed through the CGF. AT step 304, an OOG grammar is detected. At step 306, the OOG utterance is saved as a file copy (e.g., .wav file). Then, at step 308, the OOG utterance is processed through the BOG. At step 310, the OOG utterance is assigned a BOG processing result category. BOG processing result categories can be general categories such as "failed OOG utterance" (denoting BOG failed to recognize the OOG utterance) or a specific category such as "OOG recognized by BOG Rule A" (OOG was successfully recognized by a particular BOG rule (Rule A, for example)). At step 312, the CFG can be updated (or a decision can be made as to whether to update the CFG) based on the categorized/labeled OOG. As noted earlier, the CFG can be updated either manually or automatically.

Figure 4:
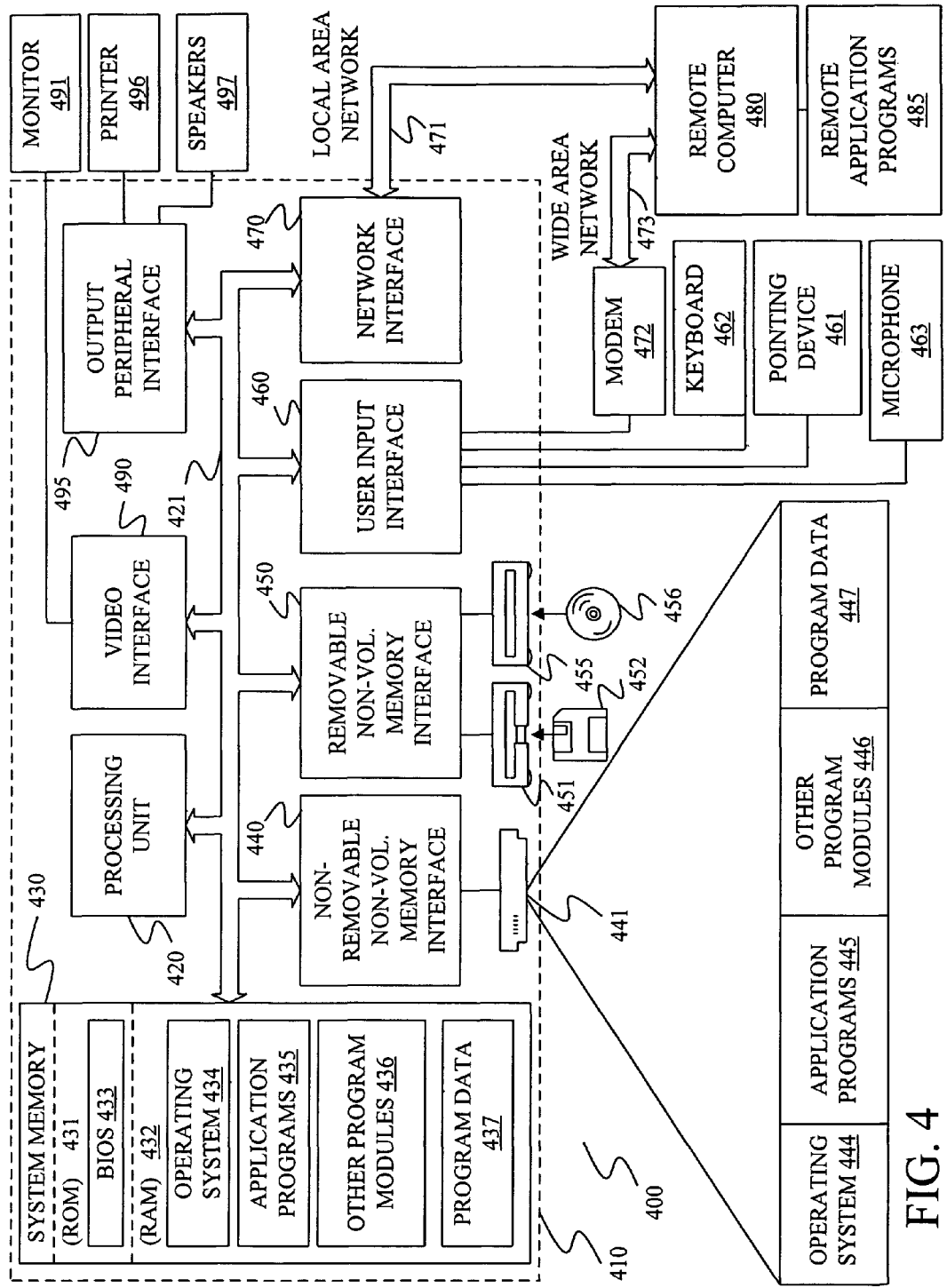
FIG. 4 is a block diagram of one computing environment in which the present embodiments may be practiced.

FIG. 4 illustrates an example of a suitable computing system environment 400 on which the present embodiments may be implemented. The computing system environment 400 is only one example of a suitable computing environment and is not intended to suggest any limitation as to the scope of use or functionality of the present embodiments. Neither should the computing environment 400 be interpreted as having any dependency or requirement relating to any one or combination of components illustrated in the exemplary operating environment 400.

The present embodiments operational with numerous other general purpose or special purpose computing system environments or configurations. Examples of well-known computing systems, environments, and/or configurations that may be suitable for use with the present embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The present embodiments may be described in the general context of computer-executable instructions, such as program modules, being executed by a computer. Generally, program modules include routines, programs, objects, components, data structures, etc. that perform particular tasks or implement particular abstract data types. The present embodiments are designed to be practiced in distributed computing environments where tasks are performed by remote processing devices that are linked through a communications network. In a distributed computing environment, program modules are located in both local and remote computer storage media including memory storage devices.

With reference to FIG. 4, an exemplary system for implementing the present embodiments include a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

Figure 5:
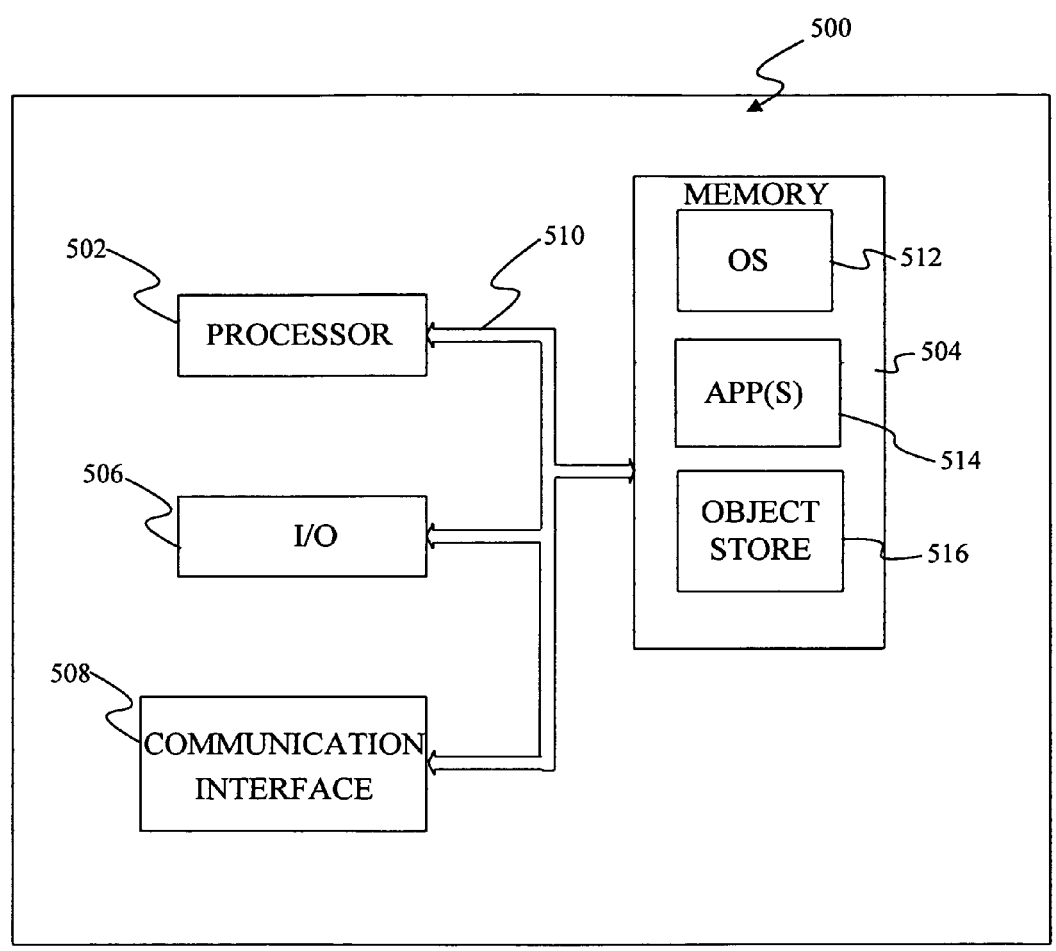
FIG. 5 is a block diagram of an alternative computing environment in which the present embodiments may be practiced.

FIG. 5 is a block diagram of a mobile device 500, which is an exemplary computing environment. Mobile device 500 includes a microprocessor 502, memory 504, input/output (I/O) components 506, and a communication interface 508 for communicating with remote computers or other mobile devices. In one embodiment, the afore-mentioned components are coupled for communication with one another over a suitable bus 510.

Memory 504 is implemented as non-volatile electronic memory such as random access memory (RAM) with a battery back-up module (not shown) such that information stored in memory 504 is not lost when the general power to mobile device 500 is shut down. A portion of memory 504 is preferably allocated as addressable memory for program execution, while another portion of memory 504 is preferably used for storage, such as to simulate storage on a disk drive.

Memory 504 includes an operating system 512, application programs 514 as well as an object store 516. During operation, operating system 512 is preferably executed by processor 502 from memory 504. Operating system 512, in one preferred embodiment, is a WINDOWS® CE brand operating system commercially available from Microsoft Corporation. Operating system 512 is preferably designed for mobile devices, and implements database features that can be utilized by applications 514 through a set of exposed application programming interfaces and methods. The objects in object store 516 are maintained by applications 514 and operating system 512, at least partially in response to calls to the exposed application programming interfaces and methods.

Communication interface 508 represents numerous devices and technologies that allow mobile device 500 to send and receive information. The devices include wired and wireless modems, satellite receivers and broadcast tuners to name a few. Mobile device 500 can also be directly connected to a computer to exchange data therewith. In such cases, communication interface 508 can be an infrared transceiver or a serial or parallel communication connection, all of which are capable of transmitting streaming information.

Input/output components 506 include a variety of input devices such as a touch-sensitive screen, buttons, rollers, and a microphone as well as a variety of output devices including an audio generator, a vibrating device, and a display. The devices listed above are by way of example and need not all be present on mobile device 500. In addition, other input/output devices may be attached to or found with mobile device 500 within the scope of the present embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A speech recognition method comprising:
    recognizing, by a processor, a user utterance using a context-free grammar (CFG) as a language model;
    identifying, by the processor, out-of-grammar (OOG) utterances that are not recognizable by the CFG;
    processing, by the processor, the OOG utterances through a back-off grammar (BOG) that is derived from the CFG and that includes a plurality of BOG rules;
    collecting statistics related to a degree of success of the plurality of BOG rules in processing the OOG utterances and statistics related to a frequency of each of the plurality of BOG rules being considered a top recognition result;
    utilizing a dictation grammar to selectively transcribe a portion of the OOG utterances based at least in part on the collected statistics; and
    incorporating the transcribed portion of the OOG utterances into the CFG.

2. The method of claim 1 wherein the transcribed portion of the OOG utterances is automatically incorporated into the CFG.

3. The method of claim 2 and further comprising repeating the steps of claim 2 iteratively until an acceptable speech recognition efficiency level is reached.

4. The method of claim 1 and further comprising saving the portion of the OOG utterances as file copies.

5. The method of claim 4 wherein the portion of the OOG utterances are saved as .wav files.

6. The method of claim 1 wherein the transcribed portion of the OOG utterances is manually incorporated into the CFG.

* * * * *